US008223965B2

(12) United States Patent
Bennett

(10) Patent No.: US 8,223,965 B2
(45) Date of Patent: Jul. 17, 2012

(54) SWITCHING NETWORK SUPPORTING MEDIA RIGHTS MANAGEMENT

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1303 days.

(21) Appl. No.: 11/527,140

(22) Filed: Sep. 26, 2006

(65) Prior Publication Data
US 2007/0260552 A1    Nov. 8, 2007

Related U.S. Application Data

(63) Continuation-in-part of application No. 11/429,477, filed on May 5, 2006, now Pat. No. 7,948,977, and a continuation-in-part of application No. 11/429,478, filed on May 5, 2006, now Pat. No. 7,596,137, and a continuation-in-part of application No. 11/491,052, filed on Jul. 20, 2006, now Pat. No. 7,895,657, and a continuation-in-part of application No. 11/474,033, filed on Jun. 23, 2006, now abandoned, and a continuation-in-part of application No. 11/527,137, filed on Sep. 26, 2006, and a continuation-in-part of application No. 11/506,729, filed on Aug. 18, 2006, and a continuation-in-part of application No. 11/506,661, filed on Aug. 18, 2006.

(51) Int. Cl.
*H04N 1/44*   (2006.01)
(52) U.S. Cl. ......... 380/201; 713/153; 709/238; 709/243
(58) Field of Classification Search ................ 380/201, 380/200, 212; 705/59; 726/26, 13; 370/469, 370/252; 713/153; 709/238, 243
See application file for complete search history.

(56) References Cited

U.S. PATENT DOCUMENTS 5,841,769 A * 11/1998 Okanoue et al. ............. 370/338
6,195,698 B1   2/2001 Lillibridge
6,266,704 B1 * 7/2001 Reed et al. .................... 709/238
6,327,652 B1 * 12/2001 England et al. .................. 713/2

(Continued)

FOREIGN PATENT DOCUMENTS
EP   1063833 A   12/2000
(Continued)

OTHER PUBLICATIONS

Taiwanese Office Action dated Dec. 6, 2011.

(Continued)

*Primary Examiner* — Thanhnga B Truong
(74) *Attorney, Agent, or Firm* — Garlick & Markison; Edward J. Marshall

(57) ABSTRACT

A communication infrastructure containing a plurality of templates stored in an intermediate routing node and data rights management service function that determines an incoming packet contains media content by comparing the packet contents with the plurality of predefined templates and verifies whether associated license in the packet is valid. The intermediate routing node triggers the data rights management service function, if the associated license is not valid. The data rights management service function verifies rights of the user of the destination device to use the media content and interacts with the destination device to verify the validity of the license. In addition, the intermediate routing node interacts with a media manufacturer's server to verify the validity of the license. An external data rights management server may in part or full carry out the DRM functionality, to assist the intermediate routing node.

14 Claims, 10 Drawing Sheets

U.S. PATENT DOCUMENTS

| | | | |
|---|---|---|---|
| 6,393,568 B1 | 5/2002 | Ranger et al. | |
| 6,744,783 B1* | 6/2004 | Tzeng | 370/469 |
| 7,120,250 B2* | 10/2006 | Candelore | 380/200 |
| 7,684,566 B2* | 3/2010 | Oliveira et al. | 380/212 |
| 2002/0007453 A1 | 1/2002 | Nemovicher | |
| 2002/0069370 A1 | 6/2002 | Mack | |
| 2002/0087885 A1 | 7/2002 | Peled et al. | |
| 2002/0129140 A1 | 9/2002 | Peled | |
| 2002/0129237 A1 | 9/2002 | Radatti | |
| 2003/0172262 A1 | 9/2003 | Curry | |
| 2004/0003044 A1* | 1/2004 | Teoh et al. | 709/205 |
| 2004/0003268 A1* | 1/2004 | Bourne et al. | 713/193 |
| 2004/0172658 A1 | 9/2004 | Rakib et al. | |
| 2005/0050338 A1 | 3/2005 | Liang | |
| 2005/0050362 A1 | 3/2005 | Peles | |
| 2005/0210533 A1 | 9/2005 | Copeland | |
| 2005/0238005 A1 | 10/2005 | Chen et al. | |
| 2005/0251486 A1 | 11/2005 | Nair | |
| 2005/0278784 A1 | 12/2005 | Gupta | |
| 2006/0072582 A1 | 4/2006 | Bronnimann et al. | |
| 2006/0075494 A1 | 4/2006 | Bertman | |
| 2006/0085528 A1 | 4/2006 | Thomas | |
| 2006/0095971 A1 | 5/2006 | Costea | |
| 2006/0167985 A1* | 7/2006 | Albanese et al. | 709/203 |
| 2006/0174345 A1 | 8/2006 | Flanagan | |
| 2006/0206432 A1* | 9/2006 | Russell et al. | 705/57 |
| 2006/0230458 A1* | 10/2006 | Saeki et al. | 726/26 |
| 2006/0248575 A1 | 11/2006 | Levow | |
| 2007/0203841 A1* | 8/2007 | Maes | 705/52 |

FOREIGN PATENT DOCUMENTS

| | | |
|---|---|---|
| EP | 1335559 A | 8/2003 |
| EP | 1560398 A2 | 1/2005 |
| EP | 1699204 A | 9/2006 |
| KR | 2004 0102907 A1 | 12/2004 |
| TW | 200513091 | 4/2005 |
| WO | WO 97/12321 A | 4/1997 |
| WO | WO 0219639 A | 3/2002 |
| WO | WO 2004/091158 A | 10/2004 |
| WO | WO 2005/017708 A | 2/2005 |

OTHER PUBLICATIONS

Maya Gokhale et al; "Granidt: Towards Gigabit Rate network Intrusion Detection Technology"; FPL 2002, Montpellier,France.

Dharmapurikar S. et al; "Deep Packet Inspection Using Parallel Bloom Filters"; IEEE Micro, IEEE Service Center Los Alamitos, CA,US Jan. 2004.

Steve White, et al; "Anatomy of a Commercial-Grade Immune System"; Internet Citation, Jun. 1999 (XP-002310183).

Young H. Cho, et al; "A Pattern Matching Co-processor for Network Security"; DAC 05; Proceedings of the 42nd Annual Conf. on Design Automation Jun. 13, 2005.

Shanmugasundaram Kulesh et al; "Payload Attribution via Hierarchical Bloom Filters"; Proc ACM Conf Computer Commun Secur; Proceedings of the ACM Conf on Computer & Comm. 2004 (XP002453251).

CISCO; "Committed Access Rate"; Internet Citation 1999 (XP-002375164).

CISCO ISP Essentials; Internet Citation Jun. 6, 2001 (XP-002217477).

David Whyte, et al; "DNS-Based Detection of Scanning Worms in an Enterprise Network";Security Symposium, Feb. 4, 2005 (XP-002412148).

* cited by examiner

SWITCHING NETWORK SUPPORTING MEDIA RIGHTS MANAGEMENT

CROSS REFERENCE TO RELATED APPLICATIONS

The present application is a continuation-in-part of:

Utility application Ser. No. 11/429,477, filed on May 5, 2006 issued May 24, 2011 as U.S. Pat. No. 7,948,977, and entitled "PACKET ROUTING WITH PAYLOAD ANALYSIS, ENCAPSULATION AND SERVICE MODULE VECTORING";

Utility application Ser. No. 11/429,478, filed on May 5, 2006 issued Sep. 29, 2009 as U.S. Pat. No. 7,596,137, and entitled "PACKET Routing and Vectoring Based on Payload Comparison with Spatially RELATED TEMPLATES";

Utility application Ser. No. 11/491,052, filed on Jul. 20, 2006 issued Feb. 22, 2011 as U.S. Pat. No. 7,895,657, and entitled "SWITCHING NETWORK EMPLOYING VIRUS DETECTION";

Utility application Ser. No. 11/474,033, filed on Jun. 23, 2006 now abandoned, and entitled "INTERMEDIATE NETWORK NODE SUPPORTING PACKET ANALYSIS OF ENCRYPTED PAYLOAD";

Utility application Ser. No. 11/527,137 filed on Sep. 26, 2006, issued Jul. 6, 2010 as U.S. Pat. No. 7,751,397, and entitled "SWITCHING NETWORK EMPLOYING A USER CHALLENGE MECHANISM TO COUNTER DENIAL OF SERVICE ATTACKS";

Utility application Ser. No. 11/506,729 filed on Aug. 18, 2006, pending and entitled "SWITCHING NETWORK EMPLOYING ADWARE QUARANTINE TECHNIQUES"; and Utility application Ser. No. 11/506,661 filed on Aug. 18, 2006, pending, and entitled "SWITCHING NETWORK EMPLOYING SERVER QUARANTINE FUNCTIONALITY", the complete subject matter of all of these are incorporated herein by reference in their entirety for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to communication infrastructures, and, more particularly, to switching node operations in a packet switched communication network.

2. Related Art

Today's communication networks extensively communicate media contents containing audio files, video images and moving video files. Communication networks include both packet switched and circuit switched networks, often interconnected via network bridges. An Internet network typically includes switching devices such as routers, switches, packet switched exchanges, access points, Internet service provider's networks (ISPN) and Internet communication pathways, and route packets between the end point devices. Destination end point devices include personal or laptop computers, servers, set top boxes and handheld data/communication devices, for example. Servers often act as source end point devices, sourcing media content to the destination devices to be presented to the users of the destination devices.

Audio files, video image files, and moving video files are usually copyright protected and contain digital signatures. These digital signatures include licenses given to a user that may include unlimited licensing, limited licensing, number of delivery limitations, number of replay limitations, user license limitations, and/or time frame limitations. Trafficking of these audio files, video images and moving video files via communication networks may violate these licenses causing enormous losses to the owners/licensees of the copyrighted media. In order to prevent illegal copying of transmitted media, some media is communicated in encrypted, encoded, or transcoded format to conceal the nature of the media. However, in many cases, transfer of media in this/these format(s) constitutes illegal sharing of media. For example, a source end point device may be a server that illegally distributes music or video content via communication networks to recipients across the globe. Traditional techniques to prevent illegal copying/use have been typically unsuccessful in preventing or monitoring such illegal copying/use.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, a communication infrastructure containing a communication pathway, that communicates a packet with media content from a source device to a destination device. The communication pathway contains an intermediate routing node. In addition, the communication infrastructure contains a plurality of templates stored in the intermediate routing node and data rights management service function. The intermediate routing node receives the packet with media content, determines that the packet contains media content by comparing the packet contents with the plurality of predefined templates and identifies that license in the packet with media content is not valid. Then, the intermediate routing node responds to the identification of invalid license by triggering the data rights management service function.

The intermediate routing node verifies rights of the user of the destination device to use the media content and interacts with the destination device to verify the validity of the license. In addition, the intermediate routing node interacts with a media manufacturer's server to verify the validity of the license. An external data rights management server may in part or full carry out the DRM functionality, to assist the intermediate routing node.

In accordance with the present invention, an intermediate routing node in a communication infrastructure that routes a packet containing media content from a source device, containing a network interface, storage containing a plurality of templates and a plurality of internal data rights management service functions and processing circuitry. The processing circuitry receives the packet containing media content, compares the contents of the packet with at least one of the plurality of templates, identifies that the packet with media content does not have valid license and responds by triggering at least one of the plurality of internal data rights management service functions.

Features and advantages of the present invention will become apparent from the following detailed description of the invention made with reference to the accompanying drawings.

DETAILED DESCRIPTION OF THE INVENTION

Figure 1:
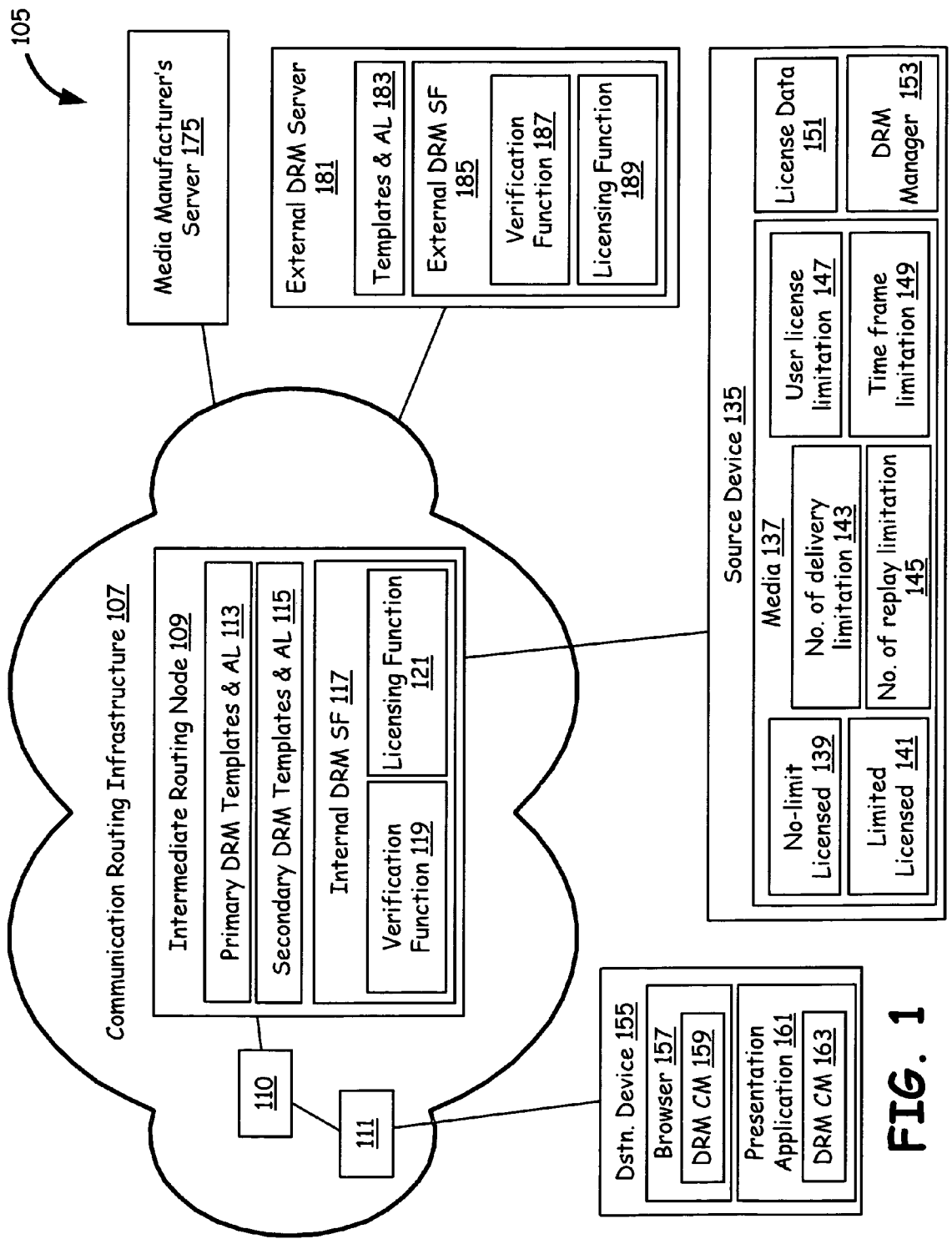
FIG. 1 is a schematic block diagram illustrating an embodiment of a communication infrastructure built in accordance with the present invention, wherein an intermediate routing node provide data right protection to the packets containing media content.

FIG. 1 is a schematic block diagram illustrating an embodiment of a communication infrastructure 105 built in accordance with the present invention, wherein an intermediate routing node 109 provide data right protection to the packets containing media content. More particularly, media content originating from a source device 135, destined toward a destination device 155, communicated via a communication pathway in a communication routing infrastructure 107, is verified for license by intermediate routing nodes such as 109 to 111. In addition, measures are taken by intermediate routing nodes 109 to 111 to prevent theft of media content using communication routing infrastructure 107. To this end, the intermediate routing nodes 109 to 111 utilize primary DRM templates and associated logic, secondary DRM templates and associated logic and internal data rights management service functions (DRM SF) built into each of the intermediate routing nodes 109 go 111. Alternatively, verification and subsequent measures against media theft may, in part or in entirety, take place at an external DRM server 181, with assistance of media manufacturer's server 175. For this, the external DRM server 181 contains primary and secondary templates and associated logic and external DRM SF 185. Both the internal DRM SF and external DRM SF 185 contain elements of the present invention such as verification function 119, 187 and licensing function 121, 189.

The intermediate routing node 109 contains the primary DRM templates and associated logic 113, secondary DRM templates and associated logic 115 and internal DRM service functions 117 that assist in determining whether a packet contains media and if the media contained is licensed (that is, contains a digital signature). Once an invalidity of license of the media content is successfully determined, any more packets arriving from the source device 135 are interrupted by the intermediate node 109. This is done by the logic associated with the primary or secondary DRM templates 113, 115, by invoking one or more DRM service functions 117. The DRM service functions 117 may include verification function 119 that verifies the validity of a license and licensing function 121.

The DRM process begins when a packet containing media content comes along. The intermediate routing node 109 compares the packet content with primary templates and then if indicated in the associated logic, compares with secondary templates until a conclusion is arrived. Then, the logic associated with the primary or secondary templates determine that the media content is protected and that the user may have to pay for the protected media content. The templates may contain bit sequences of the media file name, media content etc. and plurality of templates may contain bit sequences slightly overlapping on each other to prevent repetition of identifying the media in subsequent packets. Then, the packet is forwarded to the internal DRM SF 117 for verification of terms of the license. Once the terms of the license are determined, the internal DRM service functions 117 may interact with either or both of source device 135 and destination device 155 to verify if the terms of the license are followed, as described with reference to the FIG. 4. If such a determination of terms of the license could not be made at the internal DRM service functions 117, the intermediate routing node 109 may interact with media manufacturer's server 175 to do the same. The external DRM server 181 may in part or full perform the entire above-mentioned functionality. This situation may occur when the internal routing node 109 is unable to perform DRM process on the media content. In addition, the media manufacturer's server 175 may generate and distribute new templates, associated logic and service functions to the intermediate routing node 109 or the external DRM server 181 periodically, as described with reference to the FIG. 2.

The source device 135 may be originator of media content, or may simply be a manager for a plurality of media sources. A media content 137, that is illustrated as being contained in the source device 135, may reside in the storage of the source device 135 or may be distributed among a plurality of the sources that media source 135 manages. The media 137 may contain media contents such as movie, music with or without license. The licensed media that is stored in the media 137 may be of type no-limit license media 139, limited licensed media 141, number of delivery limitation media 143, number of replay limitation media 145, user license limitation media 147, or period limitation media 149. If packets containing media contains no-limit license, the packet may be allowed to flow through freely any number of times and may be used any number of times. A number of delivery limitation media 143 may be allowed to flow through a certain number of times, the counting occurs when the associated logic invoke the licensing function 121. Time frame limitation media 149 is verified to confirm if the time during which the media is expected to be presented is expired. In addition, the source device may include license data 151 and DRM manager 153. The destination device 155 contains a browser 157 and presentation application 161 such as a media player that enable user to use a licensed media. Both the browser 157 and presentation application 161 contain DRM Client Module (DRM CM) 159, 163 that assist in communicating with the intermediate node 109 or the external DRM server 181, for verification of license.

The intermediate routing node 109 may be an Internet node such as a router or packet switching exchange, or GPRS (General Packet Radio Service) or any other PSTN (Public Switched Telephone Network) data networks which are typically bridged between each of the types. GPRS or PSTN data networks may allow downloading of media content such as ring tones, in which case the media source 155 may be the telephone operator's media download. The media manufacturer's server 175 may not source any media, but may attempt to withhold any such media content flow through the communication routing infrastructure 107, that is, prevent downloading media content that belongs to a particular media manufacturer, from the source device 135, to the destination device 155. This may be the case, for example, when a media manufacturer sells media content via storage devices such as a DVD (Digital Video Disk) alone and would like to prevent any such media content flow through the communication routing infrastructure 107 to prevent thefts.

The intermediate routing nodes 109 to 111 accomplish the media content protection functionality in such a manner as to not unnecessarily repeat any of the functionality along the communication pathway. This non-repetitive processing is accomplished by including a comparison table version code in the packets, after each of the media content protection processing is done. The comparison table version code incorporates information about primary and secondary DRM templates that are compared on the packet, and the DRM service functionality used on the packet by a previous node. Information contained in the comparison table version code may include the DRM template version, associated logic version, internal DRM service function versions and the DRM service functions applied locally or remotely. If any of the nodes in the communication path contains an enhanced or a recent version of DRM templates, for example, the node may determine the need of comparison with only those enhanced DRM templates. Similar considerations apply to associated logic and DRM service functions. If the comparison table version code does not exist in the packet, then the processing intermediate node determines that packet analysis has not taken place by any of the previous nodes. On the contrary, if the comparison table version code does exist, then the processing intermediate node decodes the code to determine the media content protection processes that have occurred before. Then, if any further media content protection processing is necessary only such processing are done.

To perform DRM processing mentioned above, the intermediate routing node 109 might decrypt packets if they are encrypted, and may invoke a local or remote service for such a decryption process. If the packets that arrive at a processing intermediate node are encrypted and if further analysis is indicated, then, network node proceeds with decryption of the packet. In addition, if the media content is transcoded, such a packet may be verified using video transcoding operations, as described with reference to the FIG. 3.

Figure 2:
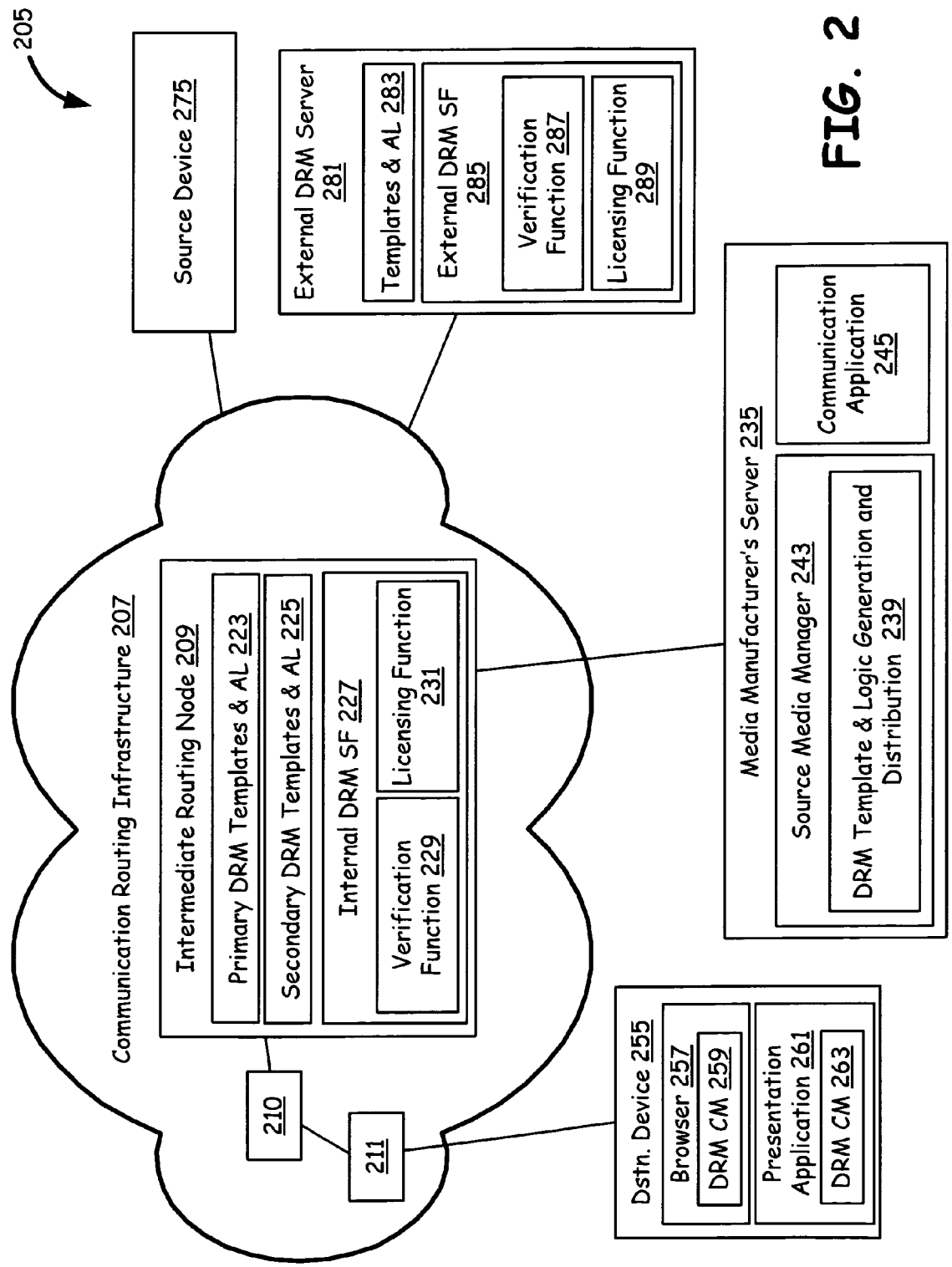
FIG. 2 is a schematic block diagram illustrating another embodiment of a communication infrastructure built in accordance with the present invention, wherein a media manufacturer's server generates and distributes necessary templates and associated logic to an intermediate routing node and external DRM server, aiding the data rights protection for their media content.

FIG. 2 is a schematic block diagram illustrating another embodiment of a communication infrastructure 205 built in accordance with the present invention, wherein a media manufacturer's server 235 generates and distributes necessary templates and associated logic to an intermediate routing node 209 and external DRM server 281, aiding the data rights protection for their media content. In specific, the media manufacturer's server 235 contains source media manager 243 that manages DRM template and logic generation and distribution 239, thus supplying the essential primary DRM templates, secondary DRM templates, associated logic and some DRM service functions to the intermediate routing node 209 and external DRM server 281. The DRM template and logic generation and distribution 239 may be automatic, semi-automatic or manual. The media manufacturer's server 235 may be any authorized support server that supports DRM (Data Rights Management) process in the intermediate routing node 209, by generating and distributing primary DRM templates, secondary DRM templates, associated logic and some DRM service functions that relates to media manufacturer's server 235. In addition, the media manufacturer's server 235 contains communication application 245 that assists in communicating with the intermediate routing node 209 or external DRM server 281, during distribution of templates and associated logic or during the DRM process described with reference to the FIG. 1.

A communication routing infrastructure 207 illustrated contains intermediate routing nodes 209 to 211, that may be an Internet node such as a router or packet switching exchange, GPRS (General Packet Radio Service) or any other PSTN (Public Switched Telephone Network) data networks. These different data networks are typically bridged between each of the types. These intermediate routing nodes such as the node 209 consists of primary DRM templates and associated logic 223, secondary DRM templates and associated logic 225 and internal DRM service functions 227, that assist in the DRM process. Similarly, the external DRM server 281 contains templates and associated logic 283 and external DRM service functions 285. These templates and associated logic 223, 225 and 283 and DRM service functions 227 and 285 are supplied, at least in part, by the media manufacturers via the media manufacturer's server 235. Both the internal DRM SF 227 and external DRM SF 285 contain elements of the present invention such as verification function 229, 287 and licensing function 231, 289.

In addition, source device 275 that originates or manages media content, and destination device 255 may interact with the media manufacturer's server 235 if necessary, during a DRM process. The destination device 255 contains browser 257 and presentation application 261 that allow the user to use the media content. The browser 257 and presentation application 261 may contain DRM client module 259, 263 that assist in DRM process at the intermediate routing node 209.

Figure 3:
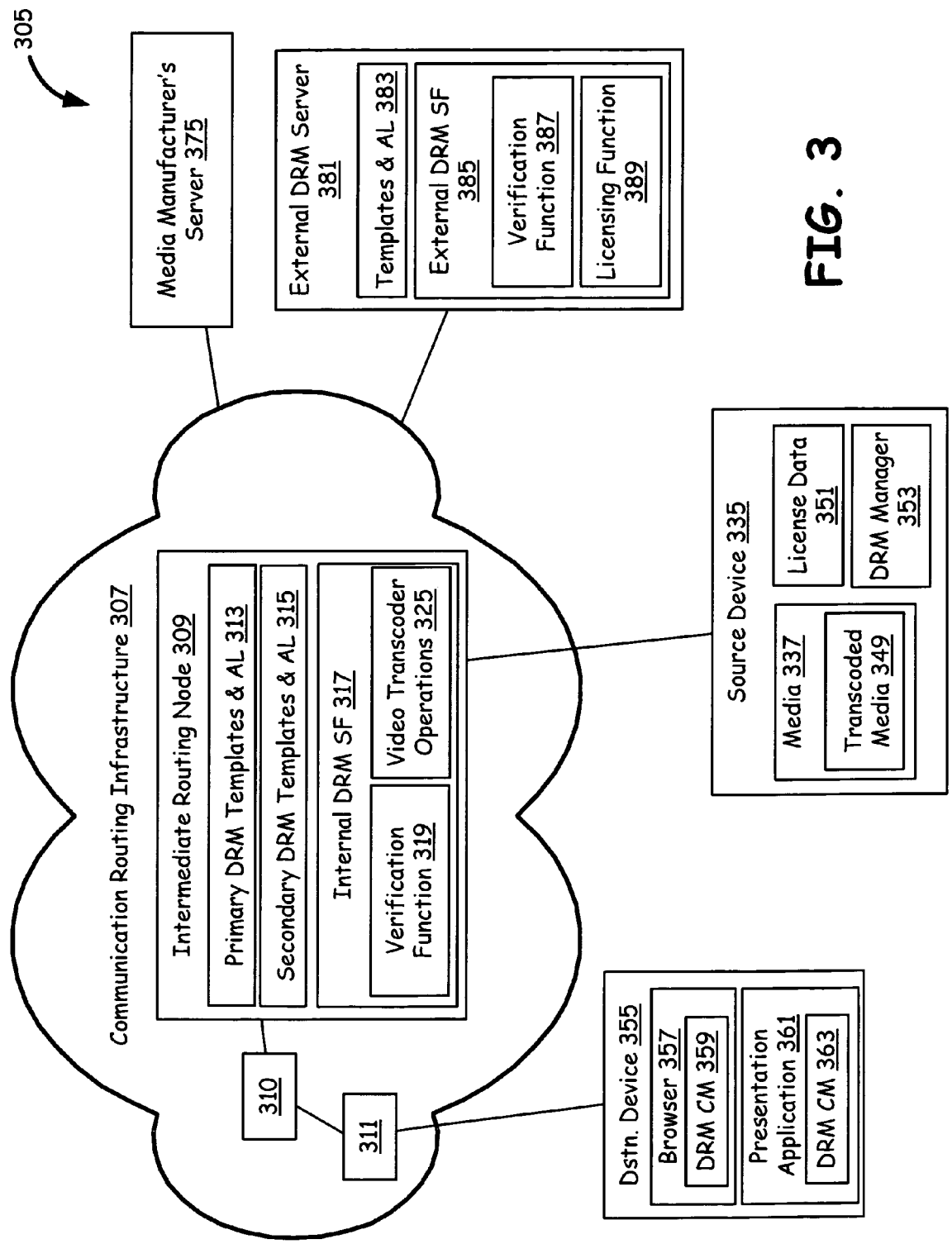
FIG. 3 is a schematic block diagram illustrating an embodiment of a communication infrastructure built in accordance with the present invention, wherein an intermediate routing node provides data right protection to the packets containing transcoded media.

FIG. 3 is a schematic block diagram illustrating an embodiment of a communication infrastructure 305 built in accordance with the present invention, wherein an intermediate routing node 309 provides data right protection to the packets containing transcoded media. The source device 335 originates or manages transcoded media 349, illustrated as a part of media content 337, destined toward destination device 355, via a communication routing infrastructure 307 containing intermediate routing nodes 309 to 311. By comparing with primary DRM templates and/or secondary DRM templates, the intermediate node 309 determines that an arriving packet contains transcoded or encoded media. The video transcoder operations 325 transcodes or decodes the media content to extract original media content that is encoded or not, with original digital signature. Then, verification function 319 verifies if the digital signature associated with the media is valid and responds appropriately. If such transcoding is not possible, then the intermediate routing node 309 may verify the digital signature associated with audio portion of the media content.

Alternatively, an external DRM server 381 may contain capabilities of video transcoding operations (not shown), along with templates and associated logic 383 and external DRM service functions 385. Both the internal DRM SF 227 and external DRM SF 285 contain elements of the present invention such as verification function 319, 387 and licensing function 389. Media manufacturer's server 375 provides necessary transcoder operation functions to the intermediate routing nodes 309 to 311. The destination device 355 contains browser 357 and presentation application 361 that allow the destination device 355 to present media content. The browser 357 and presentation application 361 may contain DRM client module 359, 363 that assist in DRM process at the intermediate routing node 309.

Figure 4:
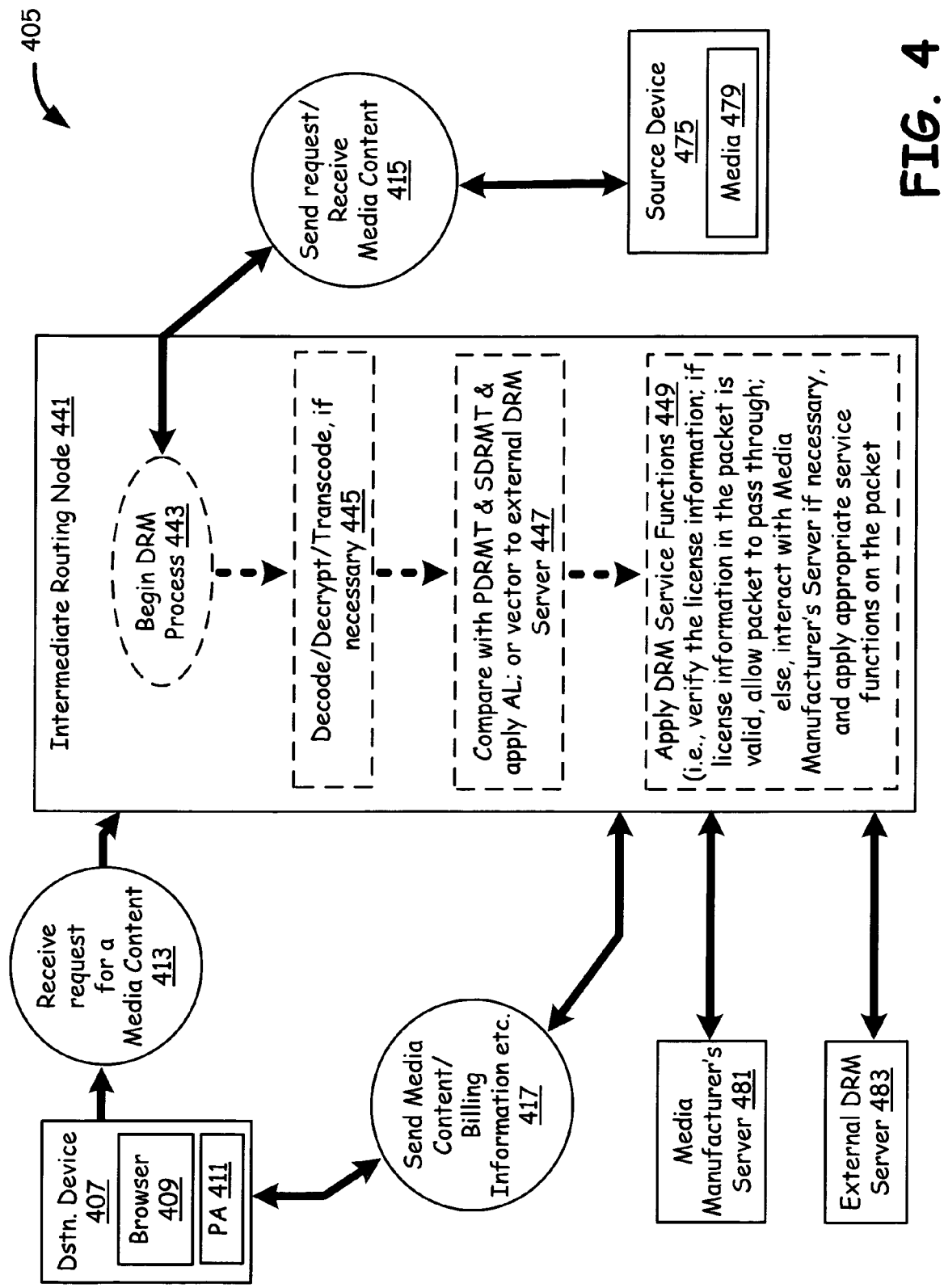
FIG. 4 is a schematic block diagram illustrating interactions between intermediate routing node, destination device, source device, media manufacturer's server and external DRM server in the communication infrastructure of FIG. 1, in accordance with the present invention.

FIG. 4 is a schematic block diagram illustrating interactions 405 between intermediate routing node 441, destination device 407, source device 475, media manufacturer's server 481, and external DRM server 483 in the communication infrastructure of FIG. 1, in accordance with the present invention. The interactions 405 begins with the intermediate routing node 441 receiving a request for a media download 413 from the destination device's 407 browser 407 or presentation application 411. This request is sent 415 to the source device 475. Then, the intermediate routing node 441 receives 415 media 479 from the source device 475.

When a first packet containing media content arrives at the intermediate routing node 441, the DRM process begins. If necessary, at a next block 445, the packet is decoded, decrypted and/or transcoded to obtain original digital signature of the media content. If such a process is not possible at the intermediate routing node, the assistance of media manufacturer's server 481 or external DRM server 483 is requested. Then, at a next block 447, the packet is compared with the primary DRM templates (PDRMT) and/or secondary DRM templates (SDRMT) and the associated logic are applied. If indicated, such a comparison process or the process thereafter may be transferred to the external DRM server 483, by vectoring the packet to the external DRM server 483. Then, at a next block 449, DRM service functions are applied, as indicated in the associated logic. In other words, the terms of the digital signature or the license are determined, and if valid, the packet containing media content is allowed to pass through 417 to the destination device 407. If the digital signature is not satisfactorily determined or not valid, media manufacturer's server 481 may be consulted. In this case, a billing session 417 is initiated with the destination device 407 with the assistance of the media manufacturer's server 481, and payment for the media content is sought from the user of the destination device 407. Once payment to the media manufacturer is done, the packet (entire media content download including subsequent packets) is communicated to the destination device 407.

Figure 5:
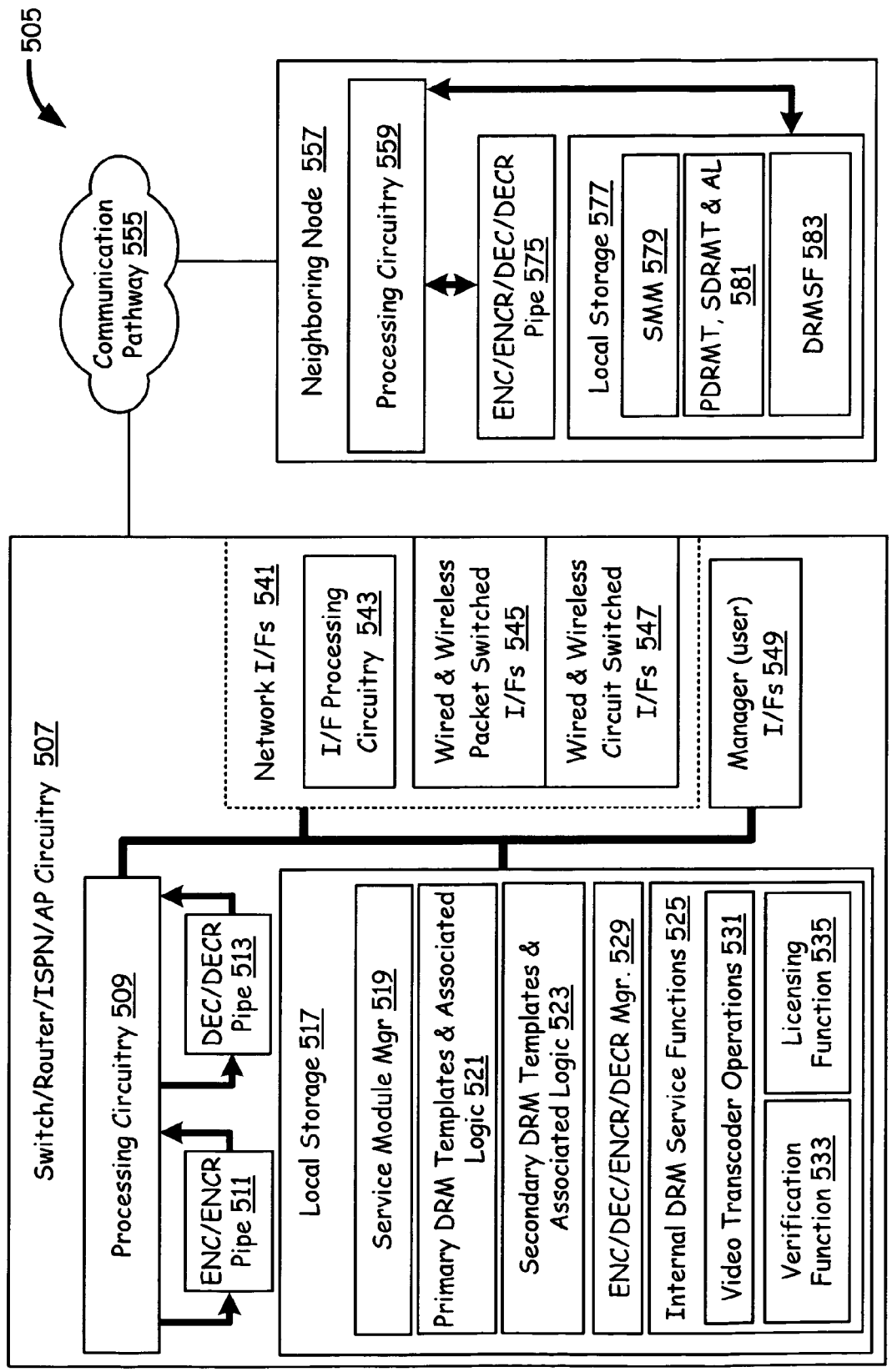
FIG. 5 is a schematic block diagram illustrating a network node (switch/router/ISPN/AP) constructed in accordance with the embodiment of FIG. 1 of the present invention.

FIG. 5 is a schematic block diagram illustrating a network node (switch/router/ISPN/AP) 507 constructed in accordance with the embodiment of FIG. 1 of the present invention. The network node circuitry 507 may represent any of the Internet nodes that route data packets and the circuitry may in part or full be incorporated in any of the network devices such as a switch, router, and ISPN or access point. In addition, the network node circuitry 507 may in part or full be incorporated in any of the PSTN or GPRS network devices. The network node circuitry 507 generally includes processing circuitry 509, local storage 517, manager interfaces 549, and network interfaces 541. These components communicatively coupled to one another via one or more of a system bus, dedicated communication pathways, or other direct or indirect communication pathways. The processing circuitry 509 may be, in various embodiments, a microprocessor, a digital signal processor, a state machine, an application specific integrated circuit, a field programming gate array, or other processing circuitry. The processing circuitry 509 is communicatively coupled to an encoding/encryption pipe 511 and decoding/decryption pipe 513. These hardware components 511 and 513 may be hardwired to increase the speed DRM processing and routing. The illustration also shows a communication pathway 555 that communicatively couples the network node 507 to a neighboring node 557, which has similar quarantine processing capabilities.

Local storage 517 may be random access memory, read-only memory, flash memory, a disk drive, an optical drive, or another type of memory that is operable to store computer instructions and data. The local storage 517 contains Service Module Manager (SMM) 519 that manages the DRM processing functionality of the network nodes 507 such as analyzing incoming packets by comparing the header contents and payload contents with appropriate DRM templates. These DRM templates and associated logic include primary DRM templates and associated logic 521, secondary DRM templates and associated logic 523. If any match is found during the primary DRM template comparison, the associated logic may direct an incoming packet containing media content to selected groups of secondary DRM templates for further analysis and after secondary DRM template comparison, the logic associated with secondary templates is applied. This process is repeated until a conclusion is reached. The conclusion reached determines that the incoming packet contains media content and the license is not valid. Then, appropriate internal DRM service functions 525 or external DRM service functions (not shown, may be available in external DRM server of FIG. 1 or other intermediate nodes) are applied. The verification function 533 and licensing function 535 verify the terms of the license or the digital signature either internally or by seeking assistance from media manufacturer's server or external DRM server (not shown). Any interaction that is necessary with destination device or source device is performed by the verification function 533 and licensing function 535. In addition, if the packets are encrypted, encoded or transcoded, the original digital signature containing in such packets are extracted by performing necessary operations by the encoding/decoding/encryption/decryption manager 529 or the DRM service functions 525 by utilizing video transcoder operations 531 or hardware units 511 and 513.

The network interfaces 541 contain wired and wireless packet switched interfaces 545, wired and wireless circuit switched interfaces 547. In addition, the network interfaces 541 may also contain built-in or an independent interface processing circuitry 543. The network interfaces 541 allow network devices to communicate with other network devices and allow processing circuitry 509 to receive and send packets, which may contain request for a webpage. The network interfaces 541 allow utilization of external DRM service functions for analysis and processing, when such functions are not available in the local storage 517. The manager interfaces 549 may include a display and keypad interfaces. These manager interfaces 549 allow the user at the network exchanges to control aspects of the present invention.

In other embodiments, the network node 507 of the present invention may include fewer or more components than are illustrated as well as lesser or further functionality. In other words, the illustrated network device is meant merely to offer one example of possible functionality and construction in accordance with the present invention. Other possible embodiment of network nodes is described with reference to the FIG. 7.

The network node 507 is communicatively coupled to external network devices, such as neighboring node 557 or external DRM servers (not shown), via communication pathway 555. The neighboring node 557 may also consist of elements of present invention such as encoding/decoding/encryption/decryption pipe 575, local storage 577, SMM (Service Module Manager) 579, PDRMT, SDRMT & AL (Primary DRM Templates, Secondary DRM Templates, and Associated Logic) 581 and DRM SF (DRM Service Functions) 583.

Figure 6:
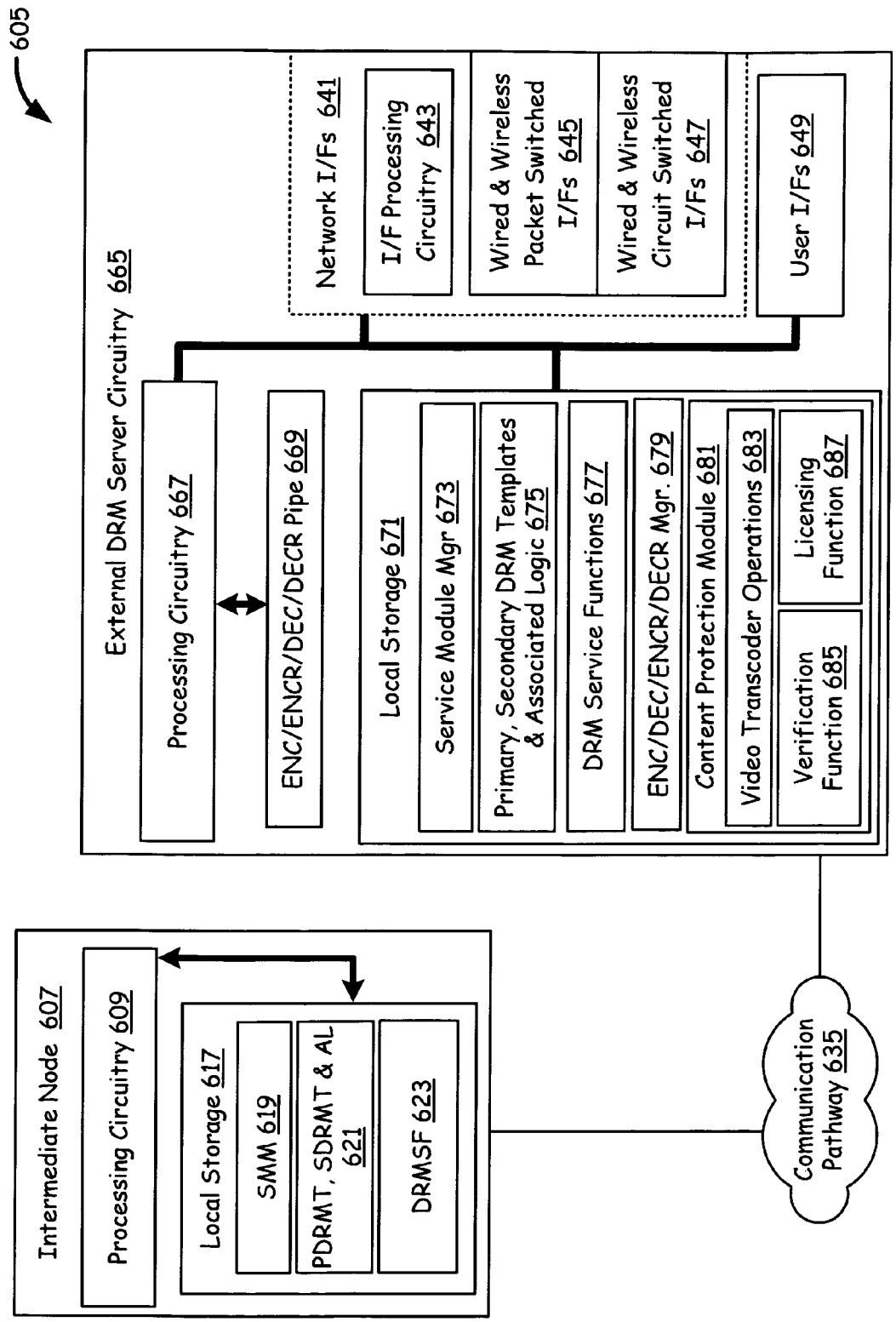
FIG. 6 is a schematic block diagram illustrating an external DRM server constructed in accordance with the embodiment of FIG. 1 of the present invention.

FIG. 6 is a schematic block diagram illustrating an external DRM server 665 constructed in accordance with the embodiment of FIG. 1 of the present invention. The external DRM server circuitry 665 performs, in part or full, the DRM processing such as identifying media content in packets, determining terms of the license, performing interaction with the destination and/or source devices. The external DRM server circuitry 665 generally includes processing circuitry 667, local storage 671, user interfaces 649, and network interfaces 641. These components communicatively coupled to one another via one or more of a system bus, dedicated communication pathways, or other direct or indirect communication pathways. The processing circuitry 667 may be, in various embodiments, a microprocessor, a digital signal processor, a state machine, an application specific integrated circuit, a field programming gate array, or other processing circuitry. The processing circuitry 667 is communicatively coupled to an encoding/encryption/decoding/decryption pipe 669.

Local storage 671 may be random access memory, read-only memory, flash memory, a disk drive, an optical drive, or another type of memory that is operable to store computer instructions and data. The local storage 671 contains elements of the present invention such as a service module manager 673, primary, secondary DRM templates and associated logic 675, DRM service functions 677, encoding/decoding/encryption/decryption manager 679, and content protection module 681. In some embodiments, functionality of content protection module 681 may be performed by the DRM service functions 677. The DRM processes performed by the external DRM server are similar to that of DRM process described with reference to the FIG. 5.

The network interfaces 641 contain wired and wireless packet switched interfaces 645, wired and wireless circuit switched interfaces 647. In addition, the network interfaces 641 may also contain built-in or an independent interface processing circuitry 643. The network interfaces 641 allow network devices to communicate with other network devices, source, and destination devices. The user interfaces 649 may include a display and keypad interfaces. These user interfaces 649 allow the user to control aspects of the present invention at the external DRM server 665.

In other embodiments, the external DRM server circuitry 665 of the present invention may include fewer or more components than are illustrated as well as lesser or further functionality. In other words, the illustrated external DRM server circuitry 665 is meant merely to offer one example of possible functionality and construction in accordance with the present invention.

The external DRM server circuitry 665 is communicatively coupled to external network devices, such as an intermediate node 607 via a communication pathway 635. The intermediate node 607 contains a processing circuitry 609 and local storage 617. The local storage 617 further contains SMM (Service Module Manager) 619, PDRMT, SDRMT & AL (Primary DRM Templates, Secondary DRM Templates and Associated Logic) 621 and DRMSF (Service DRM Functions) 623. The intermediate node 607 may have other components such as an encryption pipe and decryption pipe (not shown).

Figure 7:
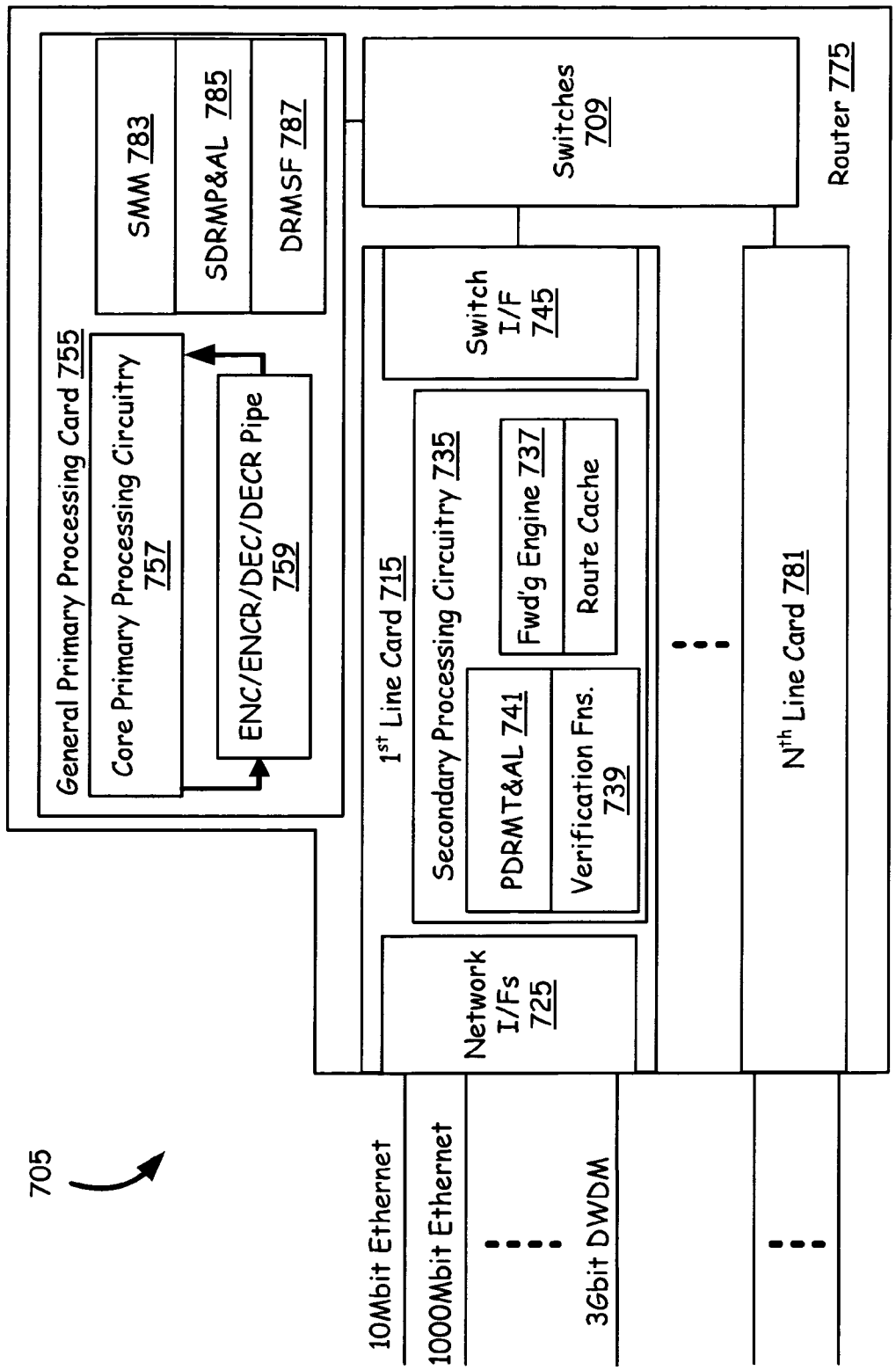
FIG. 7 is a schematic block diagram illustrating a router constructed in accordance with the embodiment of FIG. 1 of the present invention.

FIG. 7 is a schematic block diagram illustrating a router 775 constructed in accordance with the embodiment of FIG. 1 of the present invention. The router 775 may be a packet switching exchange or an access point. The router circuitry 775 generally includes general primary processing card 755, switches 709, and plurality of line cards 715 and 781. The line cards 715 and 781 may all be different in certain cases. The first line card 715 consists of network interfaces 725 capable of interfacing with wired and wireless networks such as 10 Mbit, 1000 Mbit Ethernet networks, and 3 Gbit DWDM (Dense Wavelength Division Multiplexing) fiber optic networks. The first line card 715 also contains switch interfaces 745 that allow the card to interface with interconnecting switches 709. In addition, the first line card 715 consists of secondary processing circuitry 735, which preprocesses the packets before interconnecting switches 709 route the packets. The secondary processing circuitry 735 contains forwarding engine 737 and route cache. The secondary processing circuitry 735, in addition to preprocessing the packets, also contains PDRMT & AL (Primary DRM Templates and Associated Logic) 741. The incoming packets are initially compared with primary DRM templates and associated logic is applied. If a match occurs for media content, the packet is vectored to general primary processing card 755 for further processing. The secondary processing circuitry 735 may also contain verification functions 739 and local service functions, for quick DRM processing.

The general primary processing card 755 consists of core primary processing circuitry 757, which is communicatively coupled to an encoding/encryption/decoding/decryption pipe 759. The general primary processing card 755 also contains service module manager (SMM) 783, SDRMP & AL (Supplementary DRM Templates and Associated Logic) 785 and DRMSF (DRM Service Functions) 787. The SMM 783 in conjunction with SDRMP & AL 785 and DRMSF 787 perform further DRM processing, if vectored by the first line card 715.

Figure 8:
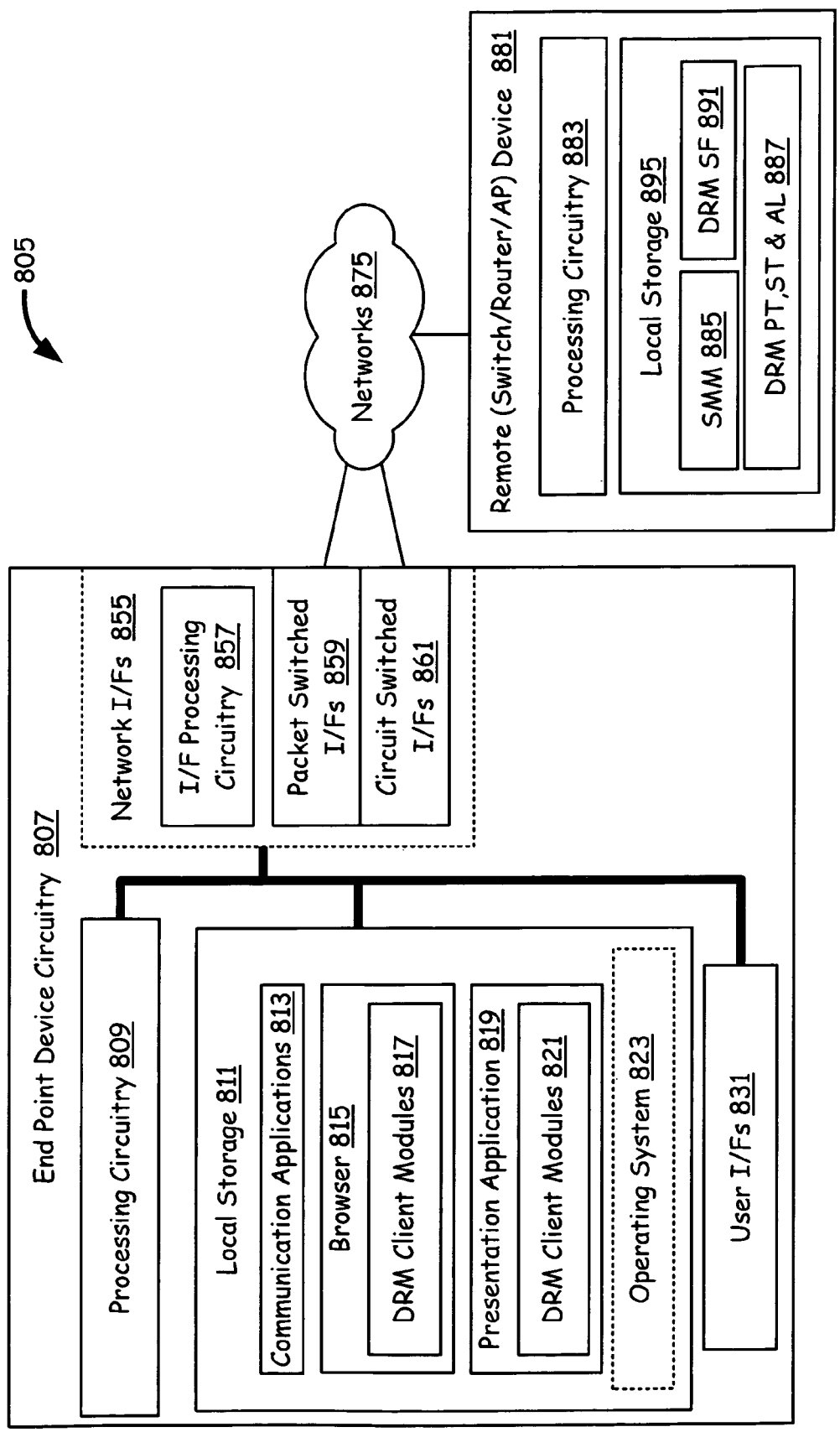
FIG. 8 is a schematic block diagram illustrating end point devices (source and/or destination devices) constructed in accordance with the embodiments of FIG. 1 of the present invention.

FIG. 8 is a schematic block diagram illustrating end point devices (source and/or destination devices) 807 constructed in accordance with the embodiments of FIG. 1 of the present invention. The end point device circuitry 807 may refer to any of the device circuitry from which packets originate and/or terminate, and the circuitry may in part or full be incorporated in any of the end point devices described with reference to the FIGS. 1, 2, 3 and 4. The end point device circuitry 807 generally includes processing circuitry 809, local storage 811, user interfaces 831, and network interfaces 855. These components communicatively coupled to one another via one or more of a system bus, dedicated communication pathways, or other direct or indirect communication pathways. The processing circuitry 809 may be, in various embodiments, a microprocessor, a digital signal processor, a state machine, an application specific integrated circuit, a field programming gate array, or other processing circuitry.

The network interfaces 855 may contain wired and wireless packet switched interfaces 859, wired and wireless circuit switched interfaces 861 and the network interfaces 855 may also contain built-in or an independent interface processing circuitry 857. The network interfaces 855 allow end point devices to communicate with any other end point devices. The user interfaces 831 may include a display and keypad interfaces.

Local storage 811 may be random access memory, read-only memory, flash memory, a disk drive, an optical drive, or another type of memory that is operable to store computer instructions and data. The local storage 811 includes communication applications 813, browser 815, and presentation application 819. The local storage 811 also contains communication applications 813, and an operating system 823. The browser 815 and presentation application 819 contain DRM client modules 817 and 821 that assist in verification of the terms and validity of the license, at the intermediate routing node such as device 881.

In other embodiments, the end point device circuitry 807 of the present invention may include fewer or more components than are illustrated as well as lesser or further functionality, and may adapt to the data packets exchange functionality rather than voice packets exchange. In other words, the illustrated end point device is meant to merely offer one example of possible functionality and construction in accordance with the present invention.

The end point device 807 is communicatively coupled to external network devices, such as the remote device 881, via networks 875. The external network device 881 may also consist of elements of present invention such as processing circuitry 883 and local storage 895 consisting, SMM 885 and PDRMT, SDRMT & AL 887 and DRMSF 891 among other functional blocks of the present invention. The source or destination devices typically communicate with each other by exchanging packets. These packets may contain media content with or without a digital signature. When a network node, such as remote device 881 detects a packet with an invalid digital signature or license, it attempts to interrupt such a media content flow.

Figure 9:
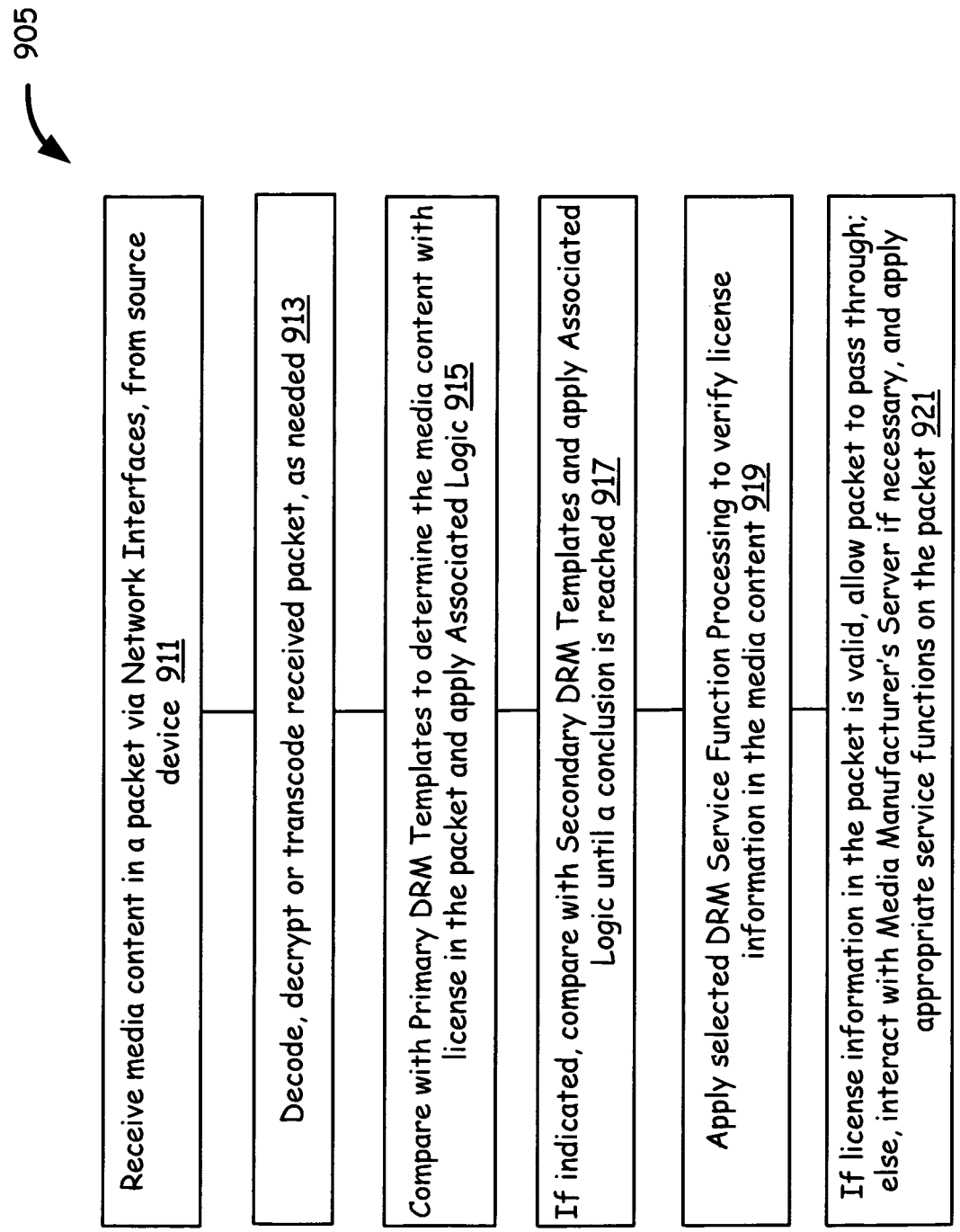
FIG. 9 is a flowchart illustrating general flow of functionality of intermediate routing node of FIG. 1.

FIG. 9 is a flowchart illustrating general flow of functionality of intermediate routing node of FIG. 1. The general flow of functionality begins at block 911, with the intermediate routing node receiving media content in a packet via network interfaces, from source device. Then, at a next block 912, the intermediate routing node determines if the media content is encoded, encrypted and/or transcoded and as needed, decodes, decrypts and/or transcodes the media content. At a next block 915, the intermediate routing node compares the media content with primary DRM templates to determine if the media content contains digital signature or license and if so, applies associated logic. If the associated logic indicates further analysis, at a next block 917, the intermediate routing node compares the media content in the packet with secondary DRM templates and applies associated logic until a conclusion is reached.

At a next block 919, the intermediate routing node applies selected DRM service function processing to verify terms or scope of the license that is available with the media content. At a next block 921, the intermediate routing node allows the packet to reach the destination device if the terms of the license are valid. If not valid, then the intermediate routing node interacts with media manufacturer's server, source device, and/or destination device and applies appropriate service functions. The application of service function may determine future course of actions such as billing the user of the destination device or not allowing downloading of the media content.

Figure 10:
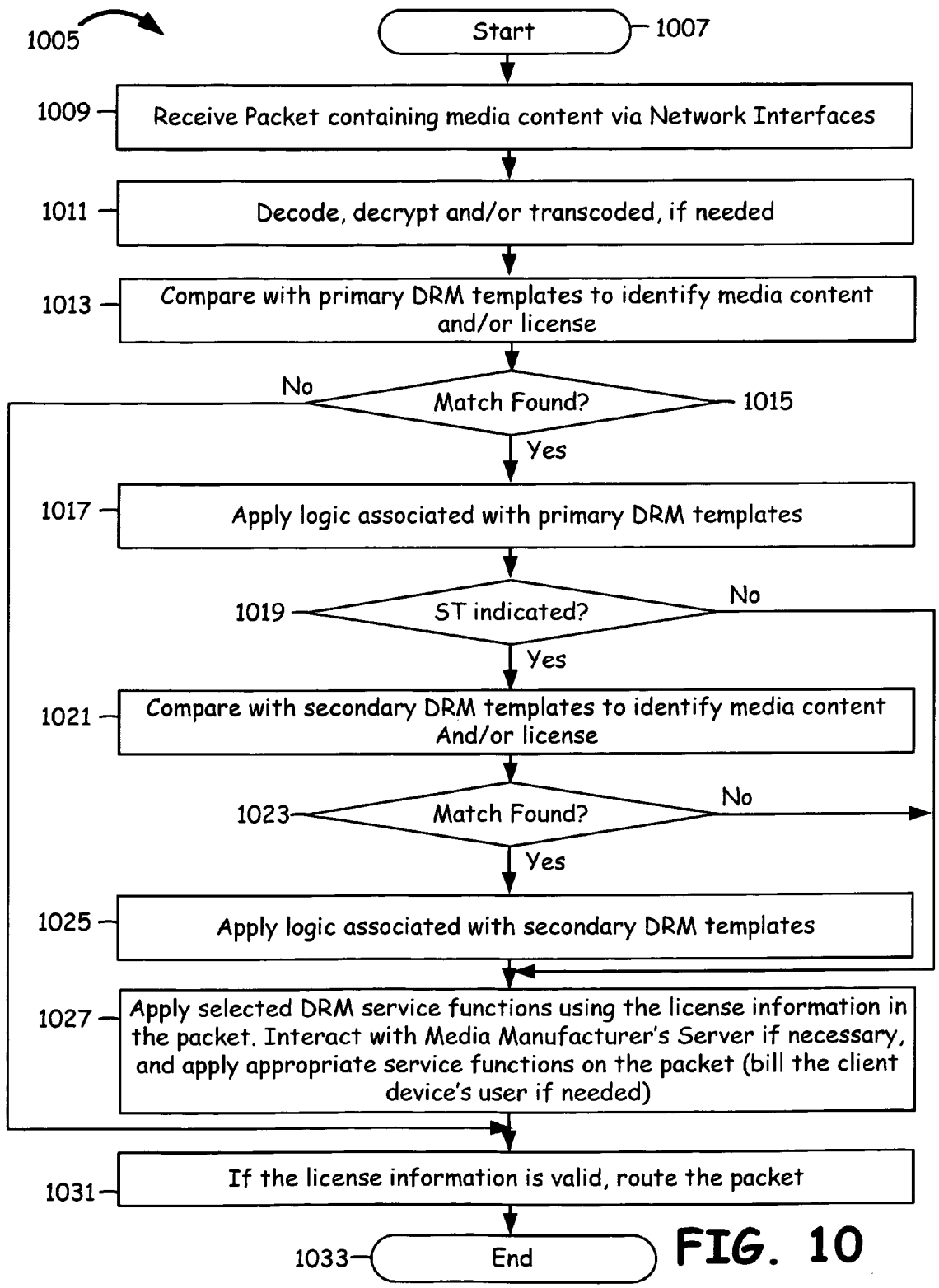
FIG. 10 is a flowchart illustrating functionality of intermediate routing node of FIG. 1, in detail.

FIG. 10 is a flowchart illustrating functionality of intermediate routing node of FIG. 1, in detail. The detailed functionality of the intermediate routing node begins at a start block 1007. At a next block 1009, the intermediate routing node receives a packet containing media content via network interfaces. At a next block 1011, intermediate routing node determines whether the media content is encoded, encrypted and/or transcoded and decodes, decrypts and/or transcodes the media content appropriately. At a next block 1013, the intermediate routing node compares the packet contents with primary DRM templates to identify media content and/or license information. At a next decision block 1015, the intermediate routing node verifies if any matches are found. If no matches are found for media content, at a block 1031, the intermediate routing node routes the packet and the detailed functionality ends at a next end block 1033.

If a match is found at the decision block 1015, at a next block 1017 the intermediate routing node applies logic associated with the primary DRM templates. The associated logic may indicate further analysis using secondary DRM templates or may indicate application of appropriate service functions, after determining invalidity of license. At a next decision block 1019, the intermediate routing node verifies if secondary DRM templates are indicated. If yes, at a next block 1021, the intermediate routing node analyzes the packet contents by comparing it with secondary DRM templates to identify media content and/or digital signature (license). If no secondary DRM templates are indicated, the detailed functionality jumps to a next block 1027.

At a next decision block 1023, the intermediate routing node verifies if any matches are found. If no matches are found, the detailed functionality jumps to a next block 1027. At a next block 1025, the intermediate routing node applies logic associated with the secondary templates. At a next block 1027, the intermediate routing node applies selected DRM service functions using the license information in the packet. Then, the intermediate routing node interacts with media manufacturer's server, source, and destination devices, as indicated the DRM service functions and applies appropriate service functions. The application of service functions determines future course of actions such as billing the user of the destination device or not allowing downloading of the media content. Once determined that the license is invalid, any such actions may also be applied on other packets of the download that arrive after the first packet of the media download. At the next block 1031, the intermediate node routes the packet if the license is found to be valid or after billing the user of the destination device, and the detailed functionality ends at the end block 1033.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An intermediate routing node in a communication infrastructure, the communication infrastructure receiving a packet including media content from a first end point device, the packet having an intended destination being that of a second end point device, the intermediate routing node comprising:
    a network interface;
    storage containing a plurality of templates;
    processing circuitry coupled to the storage and to the network interface;
    the processing circuitry of the intermediate routing node receives the packet containing media content via the network interface;
    the processing circuitry of the intermediate routing node identifies the media content of the packet through a comparison of the packet with at least one of the plurality of templates, the media content including media content requiring a license; and
    the processing circuitry of the intermediate routing node responds to the identification of the media content requiring a license, prior to delivery of the packet to the end point device, by triggering a data rights management function that includes verifying that the media content requiring a license, is licensed.

2. The intermediate routing node of claim 1, wherein the intermediate routing node comprising a router.

3. The intermediate routing node of claim 1, wherein the intermediate routing node comprising an access point.

4. The intermediate routing node of claim 1, wherein the processing circuitry performs transcoding.

5. The intermediate routing node of claim 1, wherein the data rights management function is performed at least in part by the processing circuitry.

6. The intermediate routing node of claim 1, wherein the data rights management function is performed at least in part by an external server.

7. A method performed by an intermediate network node in a communication network that routes a packet containing media content from a source device and toward a destination device, the method comprising:
    receiving, at the intermediate network node, the packet containing media content, the media content including media content requiring a license;
    comparing, at the intermediate network node, the packet with a plurality of templates;
    identifying, based on the comparing at the intermediate network node, the media content requiring a license; and
    triggering, at the intermediate network node, prior to delivery of the packet to the destination device, and in response to the identifying, a data rights management function to determine if the media content requiring a license, is licensed.

8. The method of claim 7, wherein triggering the data rights management function comprises triggering an internal data rights management function.

9. The method of claim 7, wherein triggering the data rights management function comprises triggering an external data rights management function on an external server, the external server interacts with at least one of the destination device and the source device to verify that licensing terms associated with the media content item requiring a license are followed.

10. The method of claim 7, wherein the data rights management function comprises interacting with the destination device to verify licensing.

11. The method of claim 7, wherein the data rights management function comprises interacting with the source device to verify licensing.

12. The method of claim 7, wherein the data rights management function comprises offering to sell a license.

13. The method of claim 7, further comprising performing at least a portion of the data rights management function.

14. The method of claim 7, wherein at least a portion of the data rights management function is performed by an external server.

* * * * *